(12) United States Patent
Peters et al.

(10) Patent No.: US 6,499,012 B1
(45) Date of Patent: Dec. 24, 2002

(54) METHOD AND APPARATUS FOR HIERARCHICAL TRAINING OF SPEECH MODELS FOR USE IN SPEAKER VERIFICATION

(75) Inventors: Stephen Douglas Peters, Pointe Claire (CA); Matthieu Hebert, Saint-Laurent (CA); Daniel Boies, Candiac (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/470,995

(22) Filed: Dec. 23, 1999

(51) Int. Cl.[7] .................... G10L 15/14; G10L 15/28; G10L 17/00
(52) U.S. Cl. ................ 704/256; 704/255; 704/246; 704/250
(58) Field of Search .................. 704/256, 249, 704/232, 254, 242, 252, 260

(56) References Cited

U.S. PATENT DOCUMENTS

| | | | |
|---|---|---|---|
| 5,953,701 A | * 9/1999 | Neti et al. | 704/254 |
| 6,061,653 A | * 5/2000 | Fisher et al. | 704/256 |
| 6,151,575 A | * 11/2000 | Newman et al. | 704/255 |
| 6,292,778 B1 | * 9/2001 | Sukkar | 704/256 |

OTHER PUBLICATIONS

Lawrence Rabiner, Biing–Hwang Juang, "Fundamentals of Speech Recognition", Prentice Hall Signal Processing Series, Alan V. Oppenheim, Series Editor, PP 350–352.

Gauvain et al. (1994), "maximum a posteriori estimation for multivariate Gaussain mixture observations of Markov chains", IEEE Transaction Speech Audio Process 2, pp. 291–298.

Rosenberg et al. (1996) "Speaker Background Models for Connected Digit Password Speaker Verification" Prod CASSP '96, pp. 81–84.

* cited by examiner

Primary Examiner—Richemond Dorvil
Assistant Examiner—Daniel A. Nolan

(57) ABSTRACT

A method and apparatus for generating a pair of data elements is provided suitable for use in a speaker verification system. The pair includes a first element representative of a speaker independent template and a second element representative of an extended speaker specific speech pattern. An audio signal forming enrollment data associated with a given speaker is received and processed to derive a speaker independent template and a speaker specific speech pattern. The speaker specific speech pattern is then processed to derive an extended speaker specific speech pattern. The extended speaker specific speech pattern includes a set of expanded speech models, each expanded speech model including a plurality of groups of states, the groups of states being linked to one another by inter-group transitions. Optionally, the expanded speech models are processed on the basis of the enrollment data to condition at least one of the plurality of inter-group transitions.

31 Claims, 11 Drawing Sheets

METHOD AND APPARATUS FOR HIERARCHICAL TRAINING OF SPEECH MODELS FOR USE IN SPEAKER VERIFICATION

FIELD OF THE INVENTION

This invention relates to the field of speaker verification and more particularly to a method and apparatus for generating certain data that is specific to a user and that can be used by a speaker verification system to authenticate the user based on a speech pattern. This invention is applicable to speech activated security systems such as access to voice-mail, automated telephone services, automated banking services and voice directed computer applications, among others.

BACKGROUND OF THE INVENTION

Speaker verification is the process of verifying whether a given speaker is a claimed speaker. The basis of this process lies in comparing a verification attempt with a speaker specific speech pattern representative of the claimed speaker and then calculating the likelihood of the verification attempt actually being generated by the claimed speaker. A common approach is to determine the likelihood of the verification attempt being generated by the claimed speaker given the speaker specific speech pattern. Typically, if the calculated likelihood is above a certain threshold, the verification attempt is accepted as being generated by the claimed speaker. Otherwise, the verification attempt is rejected. The level of the threshold depends on a number of factors such as the level of security required and therefore on the level of tolerance for false acceptance or false rejection.

Commonly, methods for modeling the speaker specific speech pattern make use of Continuous Density Hidden Markov Models (CDHMM) to model the acoustic characteristics. The ability of a CDHMM to model speech depends on the features, the topology, the parameterization and the training required for the CDHMM. In general, these four factors interact in a complex manner. Conventionally, the speech models are characterized by a sequence of states, the sequences of states being linked by uni-directional transitions and self-loop transitions that permit hesitation in a same given state. Typically, the parameterization chosen to define a given state is a Gaussian mixture, which is a weighted composition of a number of multivariate Gaussian probability density functions (pdfs). The CDHMM are trained on a large corpus of speech using an Expectation-Maximization (EM) algorithm.

Typical speaker verification systems generally require high performance with a minimal number of enrollment tokens. As a result, the models have many more parameters than can be supported by limited enrollment data. For high security systems making use of speaker verification, the amount of enrollment data required is prohibitively high.

Consequently, there is a need in the industry for providing a method and apparatus for providing an improved speaker specific speech pattern suitable for use by a speaker verification system.

SUMMARY OF THE INVENTION

In accordance with a broad aspect, the invention provides a method and an apparatus for creating a set of expanded speech models. The apparatus comprises an input for receiving a signal representative of enrollment data and a processing unit coupled to the input. The processing unit is operative for processing the enrollment data to generate a set of simple speech models trained on a basis of the enrollment data, each simple speech model in the set of simple speech models comprising a plurality of states linked by transitions. The processing unit is further operative for generating on a basis of the set of simple speech models a set of expanded speech models, each expanded speech model in the set of expanded speech models comprising a plurality of groups of states. The groups of states are linked to one another by inter-group transitions, the states in a given group of states originating from a single state in the set of simple speech models. The processing unit is further operative for processing the set of expanded speech models on the basis of the enrollment data to condition the inter-group transitions on the basis of the enrollment data. The apparatus further comprises an output for releasing a signal derived from the set of expanded speech models in a format suitable for use by a speech-processing device.

Advantageously, the use of a group of states originating from a single state in the set of simple speech models increases the ability to capture variability in a spoken utterance with respect to the simple model.

Another advantage of the present invention is that the set of expanded speech models can be generated with a limited amount of enrollment data.

In a specific example of implementation, the states in a given group of states are linked to one another by intra-group transitions. The processing unit is further operative for processing the set of expanded speech models on the basis of the enrollment data to condition the intra-group transitions on the basis of the enrollment data.

In a specific example, the apparatus is part of a speaker verification system.

In accordance with another broad aspect, the invention provides a method for generating a pair of data elements, namely a first element representative of a speaker independent template and a second element representative of an extended speaker specific pattern. The pair of data elements is suitable for use in a speaker verification system. The method comprises receiving an audio signal derived from a spoken utterance forming enrollment data associated with a given speaker. The method further comprises processing the audio signal on a basis of a reference speaker independent model set to derive a speaker independent template. The method further comprises processing the audio signal on a basis of a reference speaker independent model set for generating a speaker specific speech pattern. The speaker specific speech pattern includes a set of simple speech models trained on a basis of the audio signal, each simple speech model in the set of simple speech models comprising a plurality of states linked by transitions. The method further comprises processing the speaker specific pattern to derive an extended speaker specific pattern. The extended speaker specific speech pattern comprises a set of expanded speech models, each expanded speech model in the set of expanded speech models comprising a plurality of groups of states. The groups of states are linked to one another by inter-group transitions and states in a given group of states originate from a single state in the set of simple speech models. The method further comprises releasing a signal conveying the pair of data elements in a format suitable for use by a speaker verification system.

In accordance with another broad aspect, the invention further provides an apparatus for implementing the above-described method.

In accordance with another broad aspect, the invention provides a computer readable medium comprising a program element suitable for execution by a computing apparatus for implementing the above-described method.

In accordance with another broad aspect, the invention further provides a computer readable medium containing a speaker verification database comprising entries generated by the above-described method.

For the purpose of this specification, the expressions "model" and "speech model" are used to designate a mathematical representation of the acoustic properties of a sub-word unit.

For the purpose of this specification, the expression "template" is used to designate a sequence of models indicative of a word or sequence of words. The expression "template" should be given broad interpretation to include an electronic representation of the models themselves, a sequence of symbols each symbol being associated to a respective model, a sequence of pointers to memory locations allowing to extract the models or any other representation allowing a sequence of models to be extracted.

Other aspects and features of the present invention will become apparent to those ordinarily skilled in the art upon review of the following description of specific embodiments of the invention in conjunction with the accompanying figures.

DETAILED DESCRIPTION

Figure 1:
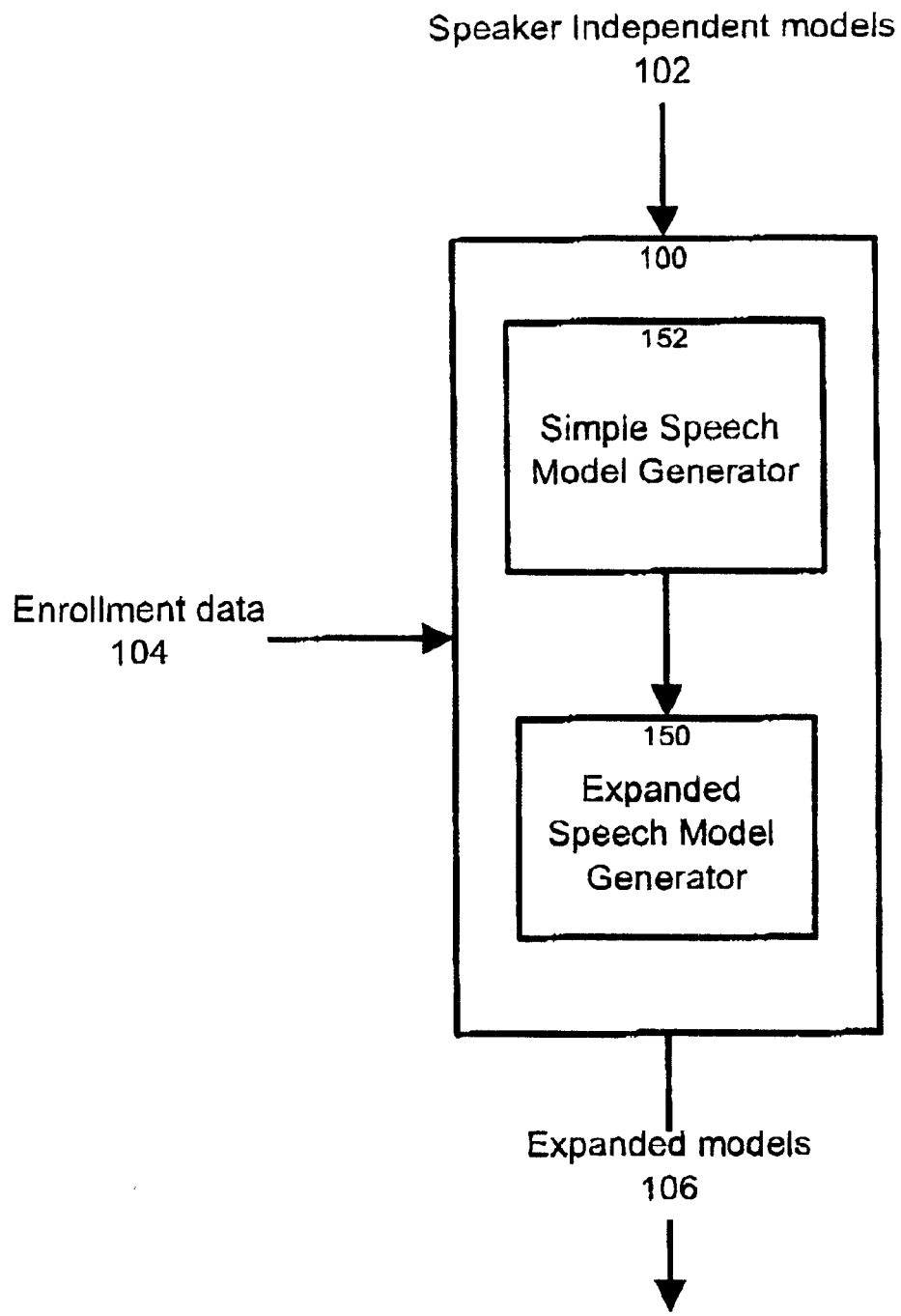
FIG. 1 shows a block diagram of an apparatus for creating a set of expanded speech models in accordance with an embodiment of the invention.

In a preferred embodiment, as shown in FIG. 1, the invention provides an apparatus 100 for creating a set of expanded speech models. The apparatus 100 comprises an input 104 for receiving a signal representative of enrollment data, a processing unit coupled to the input 104 and an output 106 coupled to the processing unit. In a specific example of implementation, the apparatus 100 further comprises a second input 102 for receiving a signal indicative of a set of speaker independent models, the set of speaker independent models being associated to the enrollment data.

In a specific form of implementation, the enrollment data received at the first input 104 is comprised of a set of feature vectors roughly representative of the acoustic properties of a password uttered by a given user. In a specific example, each feature vector includes Mel-based cepstral parameters. Feature vectors are well known in the art to which this invention pertains and will not be described further. Other formats for the enrollment data may be used without detracting from the spirit of the invention.

The speaker independent models received at input 102 are indicative of a sequence of sub-word units representative of the acoustic properties of the password corresponding to the enrollment data as would be uttered by an average speaker. In a specific example, each speaker independent model is a Hidden Markov Model (HMM). In a more specific example of implementation, the speech models are indicative of allophonic models having three states, each state having a five component mixture of Gaussians. Other suitable formats for the speaker independent models may be used without detracting from the spirit of the invention. The speech models in the speaker independent models received at input 102 are indicative of simple speech models.

The output 106 is for releasing a signal derived from the set of expanded speech models in a format suitable for use by a speech-processing device. In a specific example, the output 106 is coupled to a computer readable medium for storing the set of expanded speech models for use by a speaker verification unit.

The processing unit is for processing the enrollment data received at input 104 to generate a set of simple speech models trained on a basis of the enrollment data. Each simple speech model in the set of simple speech models generated comprises a plurality of states linked by transitions. In a specific example of implementation, the processing unit comprises two functional sub-units namely a simple speech model generator 152 sub-unit and an expanded model generator 150 sub-unit.

The simple speech model generator 152 sub-unit is operative for processing the enrollment data 104 to generate a set of simple speech models trained on a basis of the enrollment data, each simple speech model in the set of simple speech models comprising a plurality of states linked by transitions. A specific example of a method that can be use to effect the training of the speaker independent models is a maximum a posteriori adaptation method. For more information on using maximum a posteriori (MAP) adaptation, the reader is invited to consult Gauvain et al. (1994), "maximum a posteriori estimation for multivariate Gaussian mixture observations of Markov chains", IEEE Transaction Speech Audio Process. 2, pages 291 to 298. The contents of this document are hereby incorporated by reference. The result of this processing is a set of simple speech models trained on a basis of the enrollment data.

Figure 3:
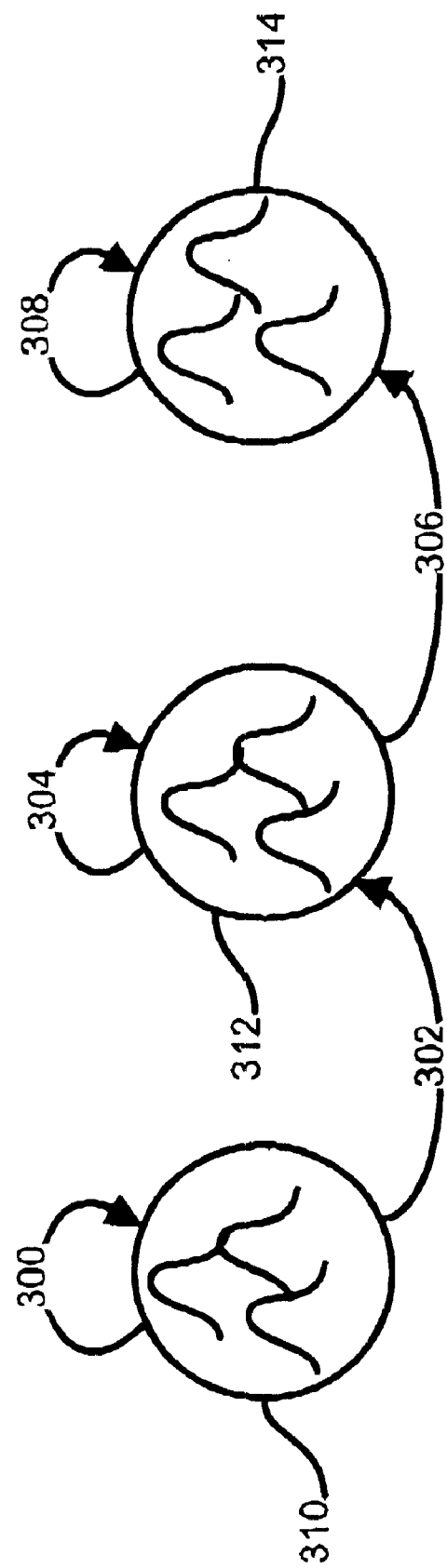
FIG. 3 shows a conceptual diagram of a simple speech model in accordance with a specific example of implementation of the invention.

FIG. 3 of the drawings shows a conceptual diagram of a simple speech model in accordance with a specific example of implementation of the invention. In FIG. 3, the states 310, 312 and 314 are depicted as circles and the transitions 302, 306, 300, 304 and 308 are depicted as arrows. Transitions 302 and 306 are inter-state transitions being indicative of transitions between two states. Transitions 300, 304 and 308 are self-loops being indicative of transitions where the originating states and the destination states are the same state. In this topology, each state 310, 312 and 314 is indicative of a Hidden Markov Model (HMM) state and is associated to a set of parameter defining a Gaussian mixture of probability density functions. Similarly, each transition 302, 306, 300, 304 and 308 is associated to a probability value. The set of parameters defining the Gaussian mixture of probability density functions for a given state in a model is an estimate of the relative probability of each component of a given Gaussian mixture. The probabilities associated to a given transition are estimates of the relative probability of hesitating in or leaving a given state.

The expanded model generator 150 sub-unit is operative for generating on a basis of the set of simple speech models a set of expanded speech models. Each expanded speech model in the set of expanded speech models comprises a plurality of groups of states, the groups of states being linked to one another by inter-group transitions. The states in a given group of states originate from a single state in said set of simple speech models.

Figure 2:
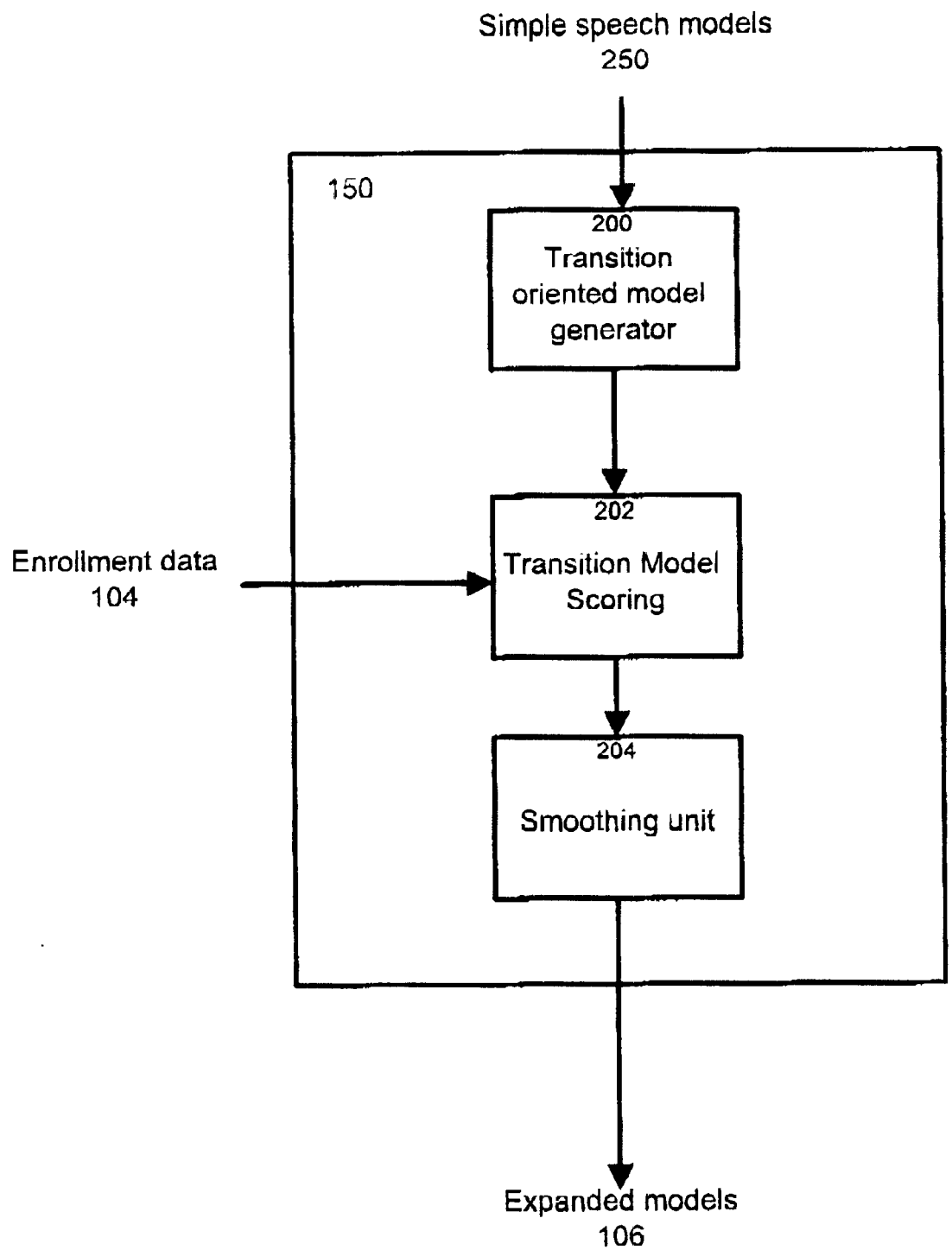
FIG. 2 shows a detailed block diagram of a an expanded speech model generator of the apparatus for creating the set of expanded speech models shown in FIG. 1.

FIG. 2 shows a block diagram of a specific example of a device for implementing the expanded model generator 150. Such a device comprises an input 250 for receiving a signal indicative of simple speech models, an output for releasing the set of expanded speech models and a group of functional units namely a transition oriented model generator 200, a transition model scoring unit 202 and a smoothing unit 204.

In a specific example of implementation, the transition oriented model generator 200 generates the expanded speech models by processing the parameters defining the mixture of Gaussians associated to respective states of the simple models. The states of a simple model are herein referred to as states of a first type and the states of the expanded speech models are herein referred to as states of a second type. In a practical implementation, the generation of states of a second type from states of a first type is effected by a simple mapping procedure. For a specific example of a suitable mapping procedure the reader is invited to refer to Lawrence Rabiner et al. "Fundamentals of Speech Recognition", Prentice-Hall, Signal Processing series, Allen V. Oppenheim, 1993, pp. 350–352. The contents of this document are hereby incorporated by reference. For a given state of the first type, the transition oriented model generator 200 generates a corresponding group of states of a second type. Each state of the second type is associated to a sub-set of the mixture of Gaussians associated to the given state of the first type. In a more specific example, for a state of the first type having an eight component mixture of Gaussians, the transition oriented model generator 200 generates two states of the second type, each state of the second type having a four component mixture of Gaussians. In this specific example, the four component mixture of Gaussians is a sub-set of the eight component mixture of Gaussians. The selection of the sub-sets may be effected by an arbitrary process or may be determined on the basis of experimentation. In another specific example, eight states of the second type are generated, each state of the second type having a single Gaussian. The previous examples are presented here for the purpose of illustration only as many variants are possible without detracting from the spirit of the invention. For example, the transition oriented model generator 200 may generate three states of the second type, two of the states of the second type having a two component mixture of Gaussian and the third state of the second type having a four component mixture of Gaussians. In a specific example of implementation, the states of a second type within a given group are linked to one another by intra-group transitions. In a specific example of implementation, the intra-group transitions within a given group are associated to a same probability value. In a more specific example, the probability value associated to an intra-group transition is derived from the probability associated to a self-loop transition for the state of the first type from which the group of states of the second type was derived. In yet a more specific example, a same probability value is associated to the self-loop transition and the intra-group transitions in the corresponding group. The states of the second type within a given group are linked to states of the second type within another group by inter-group transitions. In a specific example of implementation, the inter-group transitions from a state of the second type in a first group to another state of the second type in a second group are associated to a same probability value.

Figure 4:
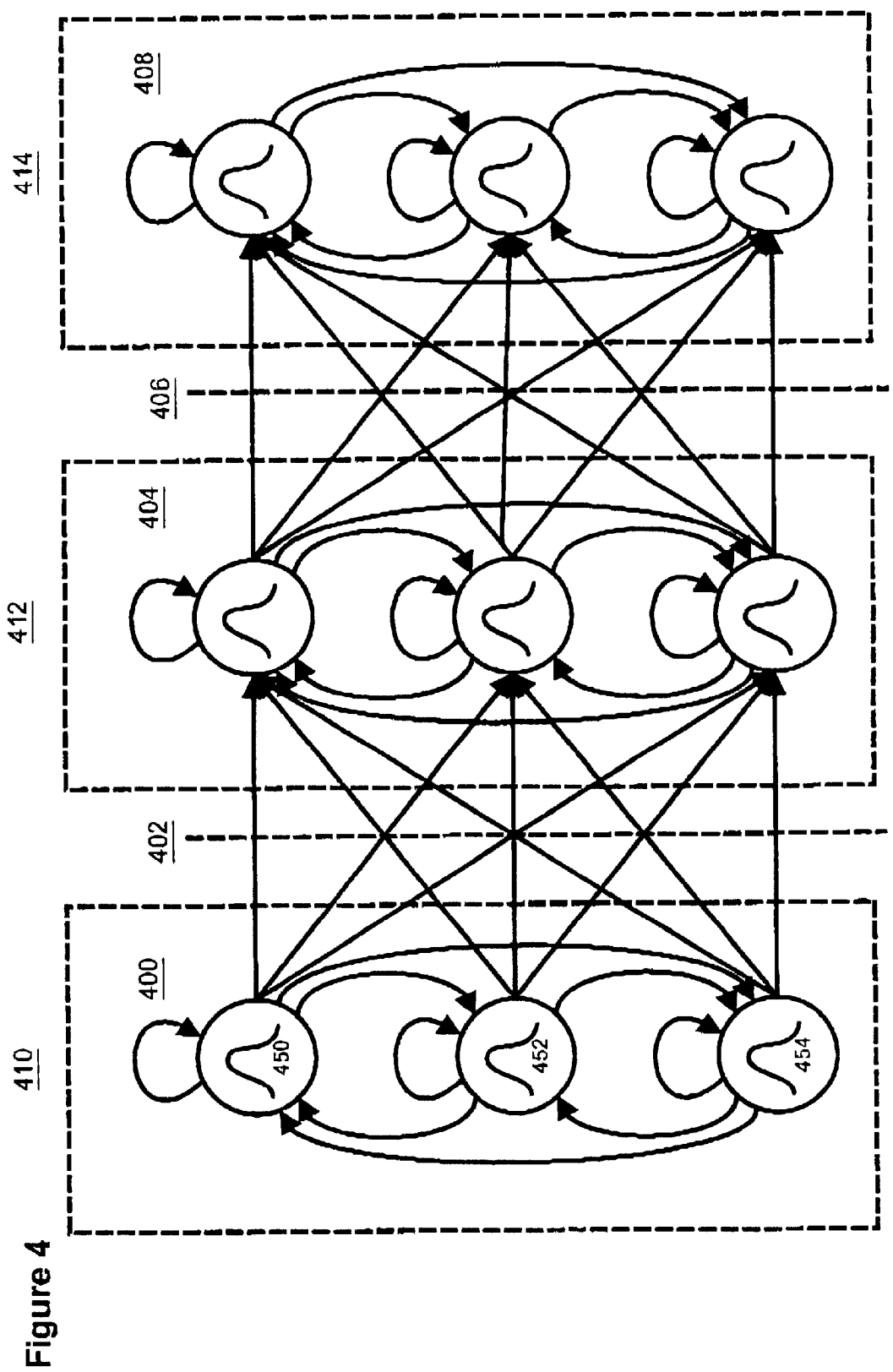
FIG. 4 shows a conceptual diagram of an expanded speech model corresponding to the simple speech model of FIG. 3 in accordance with a specific example of implementation of the invention.

FIG. 4 of the drawings shows a conceptual diagram of an expanded speech model corresponding to the simple model depicted in FIG. 3 in accordance with a specific example of implementation of the invention. In FIG. 4, the states of the second type are depicted as circles, the groups of states are depicted in stippled lines and the transitions are depicted as arrows. The groups of states 410, 412 and 414 were derived from states 310, 312 and 314 respectively. For example states 450, 452 and 454 are derived by processing the mixture of Gaussians associated to state 310 to derive three sub-sets of the mixture of Gaussians, each sub-set being assigned to a respective state of the second type 450, 452 454. Transitions 400, 404 408 are intra-group transitions. In this specific example, transitions 400 apply to all the intra-group transitions within the group 410, transitions 404 apply to all the intra-group transitions within the group 412 and transitions 408 apply to all the intra-group transitions within the group 414. The transitions 400, 404 and 408 were derived from transitions 300, 304 and 308 respectively. In a specific example, transitions 400, 404 and 408 are associated to same probability values as transitions 300, 304 and 308 respectively. Continuing the same specific example, transitions 402 and 406 are inter-group transitions between groups 410–412 and 412–414 respectively. In this specific example, transitions 402 apply to all the inter-group transitions between group 410 and 412 and transitions 406 apply to all the inter-group transitions between group 412 and 414. The transitions 402 and 406 were derived from transitions 302 and 306 respectively. In a specific example, transitions 402 and 406 are associated to same probability values as transitions 302 and 306 respectively.

The transition model scoring unit 202 is operative for processing the set of expanded speech models on the basis of the enrollment data received at input 104 to condition the inter-group transitions on the basis of the enrollment data. As a variant, the transition model scoring unit 202 is further operative for processing the set of expanded speech models on the basis of the enrollment data to condition the intra-group transitions on the basis of the enrollment data. In a specific example of implementation, the transition model scoring unit 202 conditions the inter-group transitions and the intra-group transitions that are represented by the enrollment data on the basis of observed maximum likelihood transitions in the enrollment data. In a specific implementation, a Viterbi algorithm determines the maximum likelihood transitions. The skilled person in the art will readily observe that other algorithms such as the forward-backward approach may be used to estimate transition probabilities without detracting from the spirit of the invention.

As a variant, the expanded model generator sub-unit 150 comprises a smoothing unit 204. The smoothing unit 204 is operative for smoothing the probability values associated to the transitions in the set of expanded speech models. This is particularly useful for conditioning the transitions in the expanded speech models that were not represented by the enrollment data received at input 104. This smoothing may be applied to the inter-group transitions, intra-group transitions or both types of transitions without detracting from the spirit of the invention.

In a first form of implementation, following the conditioning of the transition by the transition model scoring unit 202, the transitions that are not represented by the enrollment data are assigned a low probability value relative to the transitions that were represented by the enrollment data. In a more specific example the transitions that were not observed in the enrollment data are given a null probability value.

Figure 5:
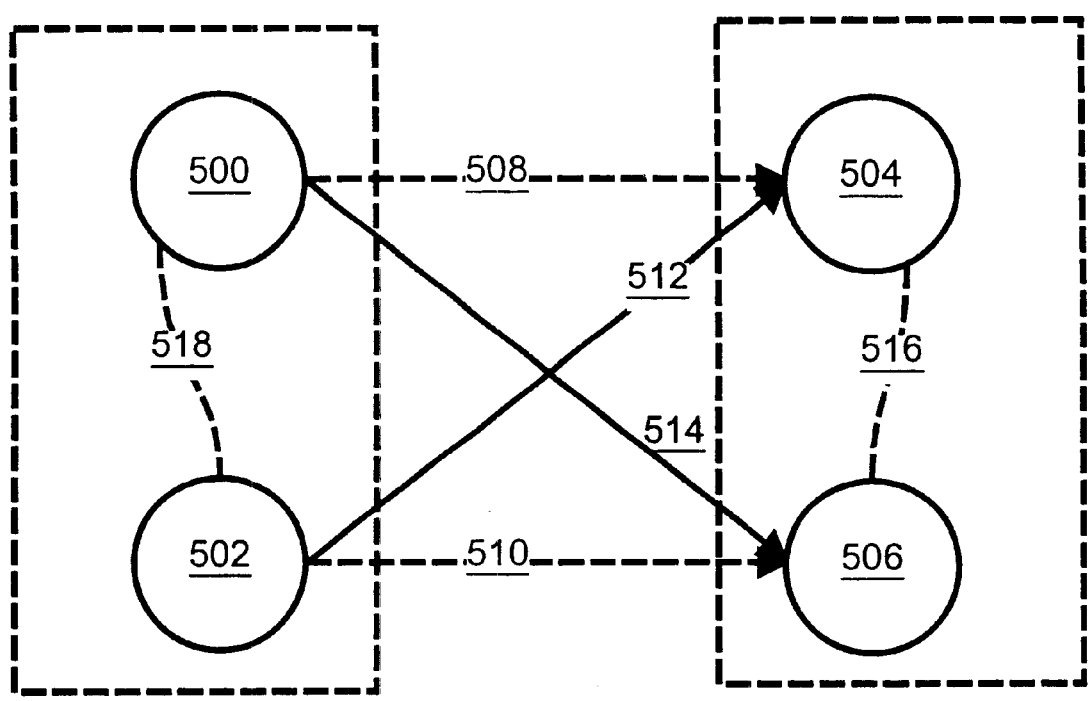
FIG. 5 shows a conceptual diagram of an expanded speech model in accordance with a specific example of implementation of the invention.

In a second form of implementation, the transitions that are not represented by the enrollment data are assigned probability values indicative of a weighted average of the probability values associated to transitions that were represented by the enrollment data. This second form of implementation will be better understood in connection with FIG. 5 of the drawings. In FIG. 5, the solid arrows 512 and 514 are indicative of transitions that are represented by the enrollment data and the stippled arrows 508 and 510 are indicative of transitions that are not represented by the enrollment data. For the sake of simplicity, transitions that are represented by the enrollment data and transitions that are not represented by the enrollment data will herein be referred to as active transitions and inactive transitions respectively. In this specific example, states 500, 502, 504 and 506 may be part of the same group or may be part of different groups. Therefore transitions 512, 514, 508 and 510 may be inter-group transitions or intra-group transitions. In a specific example, the probability assigned to a given non-active transition is derived on a basis of the set of probability values of the active transitions that share either the same source or destination state. Continuing the same specific example, the probability value of a non-active transition is derived by computing a weighted sum of the set of probability values. In a first example, given a probability of confusion p1 518 between state 500 and state 502 and a probability of confusion p2 between state 504 and state 506, the probability value assigned to transition 508 is:

Probability (Transition 508)=p1q1+p2q2 where q1 is the probability associated to transition 512 and q2 is the probability associated to transition 514. The probability associated to transition 510 is computed in a manner similar to that described in connection with transition 508. The person skilled in the art will readily observe that several variants on weighted sums may be used here without detracting from the spirit of the invention.

The probability of confusion $p_1$ 518 between state 500 and state 502 and the probability of confusion $p_2$ 516 between state 504 and state 506 are derived on a basis of a divergence calculation. The divergence is well known in the art to which this invention pertains and will not be described further. Mathematically, in the specific example where the co-variances between two states 500 502 are tied, the probability of confusion $p_1$ can be computed by the following equation:

$$p_1 = 0.5 \text{ erfc } [0.125 \, d^M_1]^{1/2}$$

$$d^M_1 = (\mu_{1a} - \mu_{1b})^T C^{-1}_1 (\mu_{1a} - \mu_{1b})$$

where $d^M_1$ is the Mahalanobis distance between the means of states a and b, where state a is state 500 and state b is state 502, where $C_1$ is the covariance matrix associated to states 500 and 502, and erfc is the complementary error function. The computation of $p_2$ can be effected in a manner similar to that described in relation to $p_1$.

Figure 6:
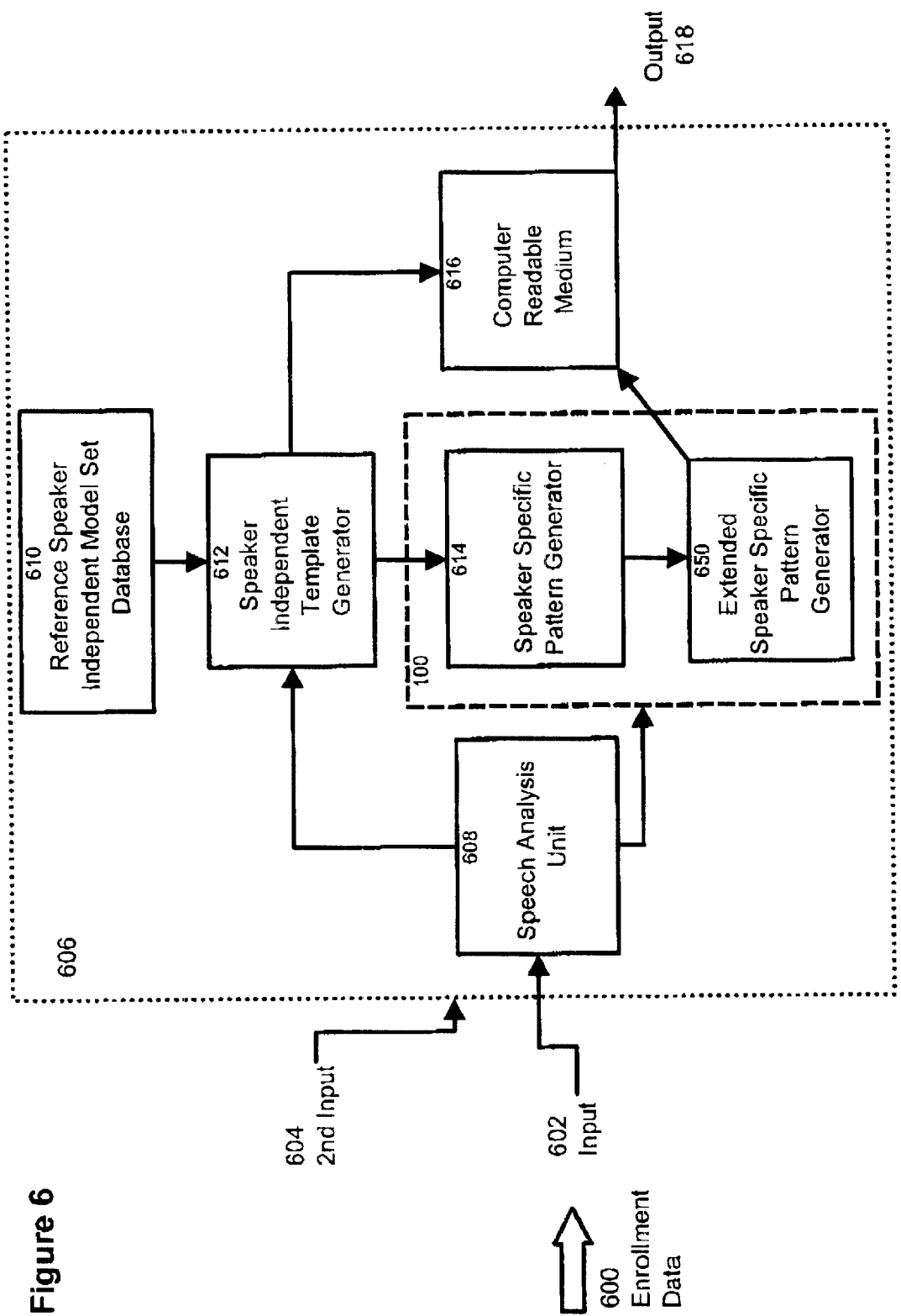
FIG. 6 shows a detailed block diagram of an apparatus for generating a pair of data elements in accordance with an embodiment of the invention.

In a specific form of implementation, the apparatus 100 for creating a set of expanded speech models is integrated into an apparatus for generating a pair of data elements, namely a first element representative of a speaker independent template and a second element representative of an extended speaker specific pattern, the pair of data elements being suitable for use in a speaker verification system. FIG. 6 of the drawings shows a detailed block diagram of a specific example of implementation of the apparatus for generating the pair of data elements suitable for use in a speaker verification system. As shown, the apparatus 606 comprises an input 602 for receiving an audio signal representative of enrollment data 600 associated with a given speaker, a set of functional modules forming a processing unit and an output 618 for releasing a signal indicative of the pair of data elements.

The processing unit is operative for processing the enrollment data 600 on a basis of a reference speaker independent model set 610 to derive a speaker independent template. The processing unit is further operative to process the enrollment data 600 on a basis of a reference speaker independent model set 610 for generating a speaker specific speech pattern and for processing the speaker specific speech pattern and enrollment data 600 to derive an extended speaker specific pattern. The speaker specific speech pattern comprises a set of simple speech models, each simple speech model having a plurality of states linked by transitions. Each extended speaker specific pattern comprises a set of expanded speech models, each expanded speech model in the set comprising a plurality of groups of states, the groups of states being linked to one another by inter-group transitions. The states in a given group of states originate from a single state in the set of simple speech models. The processing unit is further coupled to the output 618 for releasing a signal indicative of the speaker independent template and the extended speaker specific pattern in a format suitable for use by a speaker verification system. The pair of data elements is associated to the specific speaker.

In a specific example of implementation, the processing unit comprises an apparatus 100 for creating a set of expanded speech models and a speaker independent template generator unit 612. The processing unit further comprises a speech analysis unit 608, a reference speaker independent model set database 610 and a computer readable storage medium 616. The apparatus 100 is coupled to the speaker independent template generator 612 and the speech analysis unit 608.

The input 602 is operative to receive audio waves representative of the enrollment data 600 and convert them into an electronic signal. The input device 602 may be a microphone or telephone set, or any device suitable to map a spoken utterance into an electric signal suitable to be processed by electronic components. In a specific example, the enrollment data 600 is derived from an audio signal associated to a specific speaker. In a specific example of implementation, the enrollment data is indicative of a password that the specific user wishes to register in the speaker verification system. The password may be a single word such as "Buffy", a short series of words such as a set a numbers "4-9-9-6", or a complete sentence such as "Mary had a little lamb whose fleece was white as snow" without detracting from the spirit of the invention.

The speech analysis unit 608 is coupled to the input 602 and is operative to receive the electronic signal and extract the acoustic parameters associated with the enrollment data 600. The speech analysis unit 608 may form a part of the apparatus 606 or may be a separate component operatively connected to the apparatus 606 without detracting from the spirit of the invention. In a specific example of implementation, the speech analysis unit 608 is operative to map the electronic signal into a sequence of feature vectors indicative of the acoustic properties of the utterance. In a more specific example of implementation, the feature vectors are indicative of Mel-based cepstral parameters. Feature vectors are well known in the art to which this invention pertains and will not be described further. As a variant, enrollment data 600 indicative of a set of training tokens can be provided by the specific speaker in order to account for variations in pronunciation by a same specific speaker. In a specific example, the set comprises about four spoken training tokens. Other numbers of training tokens may be used without detracting from the spirit of the invention. While the speaker is uttering a subsequent utterance, the feature vectors previously derived by the speech analysis unit 608 may be stored on a computer readable medium such as a RAM or mass storage device until the set of utterance has been processed by the speech analysis unit 608.

The speaker independent template generator unit 612 is operative for processing the enrollment data 600 on a basis of a reference speaker independent model set 610 to derive the speaker independent template. In a specific example of implementation, the speaker independent template generator 612 is coupled to a reference speaker independent model set 610 database 610, the speech analysis unit 608, and apparatus 100. The reference speaker independent model set 610 comprises a plurality of speech models associated to sub-word units. The speech models may be concatenated to form a match to a spoken utterance. In a specific example of implementation, the speech models are indicative of Hidden Markov Models (HMM). In a more specific example of implementation, the reference speaker independent model set database comprises 800 allophone speech models, each comprising three states, each state having a five component mixture of Gaussians. Other speech models may be used in the context of this invention without detracting from its spirit as will be readily apparent to those skilled in the art. Reference speaker independent model sets of the type suitable for use in the context of the present invention are available as off-the-shelf components and are well known in the art to which this invention pertains. The speaker independent template generator 612 makes use of the parameters generated by the speech analysis unit 608 to derive a speaker independent template having the best total maximum likelihood, the speaker independent template comprising a sequence of sub-word units, each sub-word unit in the speaker independent template being associated to a speech model in the reference speaker independent model set database 610. Deriving a speaker independent template is well known in the art of speech recognition and will not be described further. The output of the speaker independent template generator is a speaker independent template indicative of a most probable way a specific vocabulary item corresponding to the enrollment data 600 would be uttered by an average speaker. The speaker independent template is then released by the speaker independent template generator 612.

The apparatus 100 comprises two functional units namely a speaker specific speech pattern generator unit 614, and an extended speaker specific pattern generator 650. The apparatus 100 was described above in connection with FIG. 1 of the drawings. In this specific form of implementation, the speaker specific speech pattern generator unit 614 is implemented substantially as the simple speech model generator sub-unit 152 and the extended speaker specific pattern generator 650 is implemented substantially as the expanded model generator sub-unit 150.

The speaker specific speech pattern generator unit 614 is operative for processing the enrollment data 600 on a basis of the reference speaker independent model set 610 to generate a speaker specific speech pattern. In a specific example of implementation, the speaker specific speech pattern generator 614 is coupled to the speech analysis unit 608 for receiving the set of parameters and to the speaker independent template generator 612 for receiving the speaker independent template. The speaker specific speech pattern generator 614 conditions the speech models in the speaker independent template on the basis of the parameters received from the speech analysis unit 608 to generate a speaker specific speech pattern. A specific example of a method that can be used to effect the conditioning of the speaker independent template is a maximum a posterior adaptation method. The speaker specific speech pattern generator 614 outputs a data element indicative of a speaker specific speech pattern. The speaker specific speech pattern represents a most probable way of specific word would be uttered by a specific speaker. The speaker specific speech pattern is then released by the speaker specific pattern generator 614.

The extended speaker specific pattern generator 650 comprises inputs for receiving a speaker specific speech pattern and a signal derived from the enrollment data 600. In a specific example, the extended speaker specific pattern generator 650 is coupled to the speech analysis unit 608 for receiving the set of parameters and to the speaker specific pattern generator 614 for receiving the speaker specific pattern. The extended speaker specific pattern generator 650 is operative to process the speaker specific speech pattern and the signal derived from the enrollment data 600 to derive the extended speaker specific pattern in a manner similar to that described in connection with block 150 in FIG. 1 of the drawings. The extended speaker specific pattern generator 650 further comprises an output for releasing a data element indicative of an extended speaker specific pattern.

The generated speaker independent template release by the speaker independent template generator 612 and the extended speaker specific pattern form a pair of data elements associated to a specific user.

In a specific example of implementation, the generated pair of data elements is stored in a data structure on a computer readable medium 616. In a specific example, the computer readable medium 616 is a mass-storage device, diskette, ROM unit or any other suitable device. The computer readable medium 616 may form part of the apparatus 606 or may be an external device operatively connected to the apparatus 606 by a data communication link. The data structure may take on many different formats without detracting from the spirit of the invention. In a specific example, the data structure is in the form of a table having a plurality of records, each record comprising the pair of data elements associated to a specific speaker. In a specific example of implementation, the computer readable storage medium 616 stores a plurality of records, each record being associated to a respective identifier data element allowing to retrieve a record from the computer readable medium.

Preferably, the apparatus 606 further comprises a second input 604 suitable for receiving a data element indicative of an identifier associated with a specific speaker. The identifier received at the second input 604 is stored along with the record associated to the specific speaker, thereby allowing the extraction of a record on the basis of the identifier. The identifier data element associated to the speaker may be his name, telephone number, or a magnetic swipe card proper to that specific speaker. The identifier data element provided at the second input 604 may be obtained from the user or automatically generated without detracting from the spirit of the invention.

In a specific example of implementation, the apparatus 606 for generating a pair of data elements suitable for use in a speaker verification system comprises a processor coupled to a computer readable storage medium, the computer readable storage medium comprising a program element for execution by the processor for implementing the processing unit. As a variant, the processing unit is a hardware device such as a ROM or other chip programmed on the basis of the above-described functionality.

Figure 10:
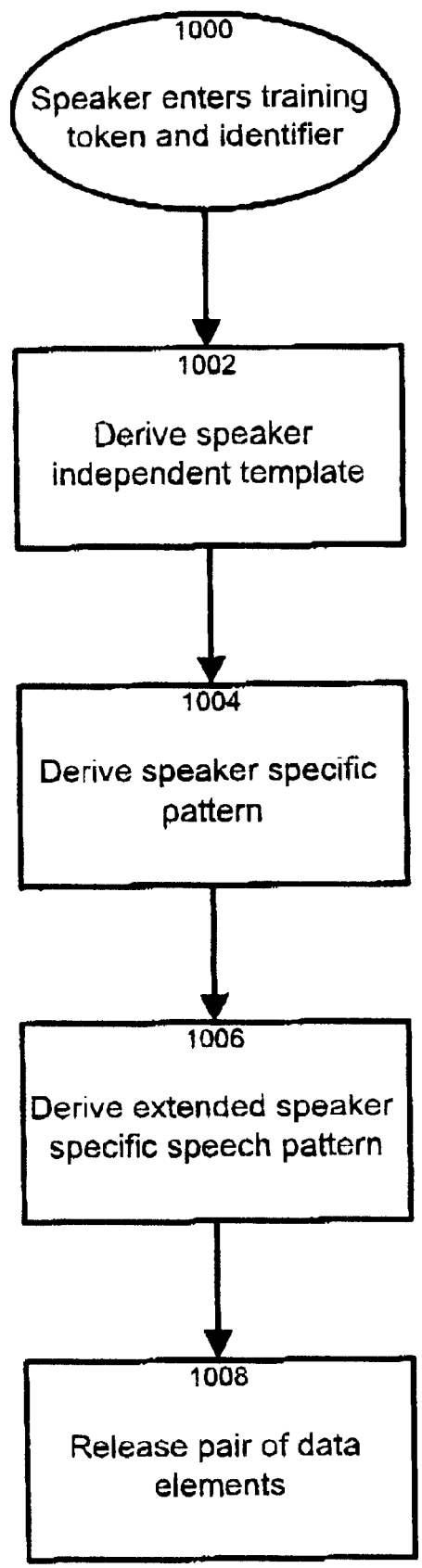
FIG. 10 shows a high-level flow chart of a method for training a speaker verification system in accordance with an embodiment of the invention.

In accordance with another aspect, the invention is embodied in a method for generating a pair of data elements, namely a first data representative of a speaker independent template and a second data element representative of an extended speaker specific speech pattern, the pair of data elements being suitable for use in a speaker verification system. As shown in FIG. 10 of the drawings, the method comprises receiving 1000 and audio signal representative of enrollment data associated with a given speaker. Optionally, the enrollment data is associated to an identifier data element associated to the given speaker. The method further provides processing the enrollment data on a basis of a reference speaker independent model set to derive 1002 a speaker independent template. In a specific example of implementation, step 1002 may be effected by the same methods discussed in conjunction with the speech analysis unit 608 and the speaker independent template generator 612 in FIG. 6 of the drawings. The method further comprises processing the enrollment data on a basis of a reference speaker independent model set to derive 1004 a speaker specific speech pattern. In a specific example of implementation, step 1004 may be effected by the same methods discussed in conjunction of the speaker specific speech pattern generator 614 in FIG. 6 of the drawings. The method further provides processing the speaker specific speech pattern and the enrollment data to derive 1006 an extended speaker specific pattern. In a specific example of implementation, step 1006 may be effected by the same methods discussed in conjunction of the extended speaker specific pattern generator 650 in FIG. 6 of the drawings. The method further comprises releasing 1008 a signal indicative of the pair of data elements in a format suitable for use by a speaker verification system.

As a variant, the method may further comprise storing the pair of data elements in a data structure on a computer readable medium. In a specific example, the computer readable medium is embodied as described in conjunction of the computer readable storage medium 616 in FIG. 6 of the drawings. The data structure may take on many different formats without detracting from the spirit of the invention. In a specific example, the data structure is in the form of a table having a plurality of records, each record comprising a pair of data elements associated to a specific speaker. In a specific example of implementation, the computer readable storage medium stores a plurality of records, each record being associated to a respective identifier data element allowing to retrieve a record from the computer readable medium.

In yet another variant, the method further comprises receiving an identifier indicative of the given speaker, the identifier allowing characterizing a given record as being associated to the given speaker. The identifier is stored along with the record associated to the specific speaker, thereby allowing the extraction of a record on the basis of the identifier. The identifier data element associated to the speaker may be his name, telephone number, another password or a magnetic swipe card proper to that specific speaker. The identifier data element may be provided by the given speaker or may be automatically generated without detracting from the spirit of the invention.

Figure 7:
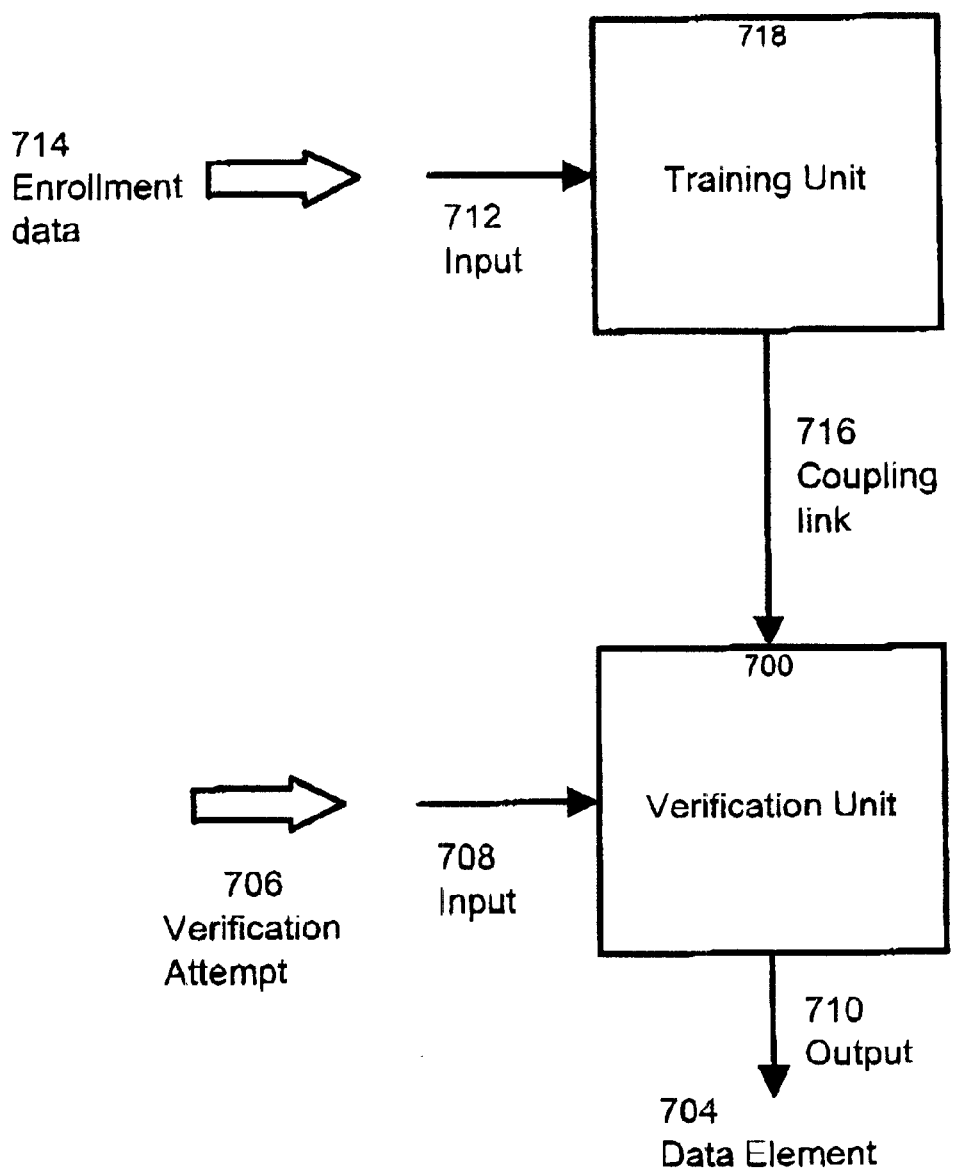
FIG. 7 shows a high-level block diagram of a speaker verification system in accordance with an embodiment of the invention.

The method and apparatus described above may be integrated into a speaker verification system of a type shown in FIG. 7 of the drawings. Such a system typically comprises two functional blocks namely a training unit 718 and a verification unit 700. The verification unit 700 is coupled to the training unit 718 by a coupling link 716. The speaker verification system further comprises an output 710 for releasing a data element 704 indicative of whether the verification attempt 706 is successful or unsuccessful.

The training unit 718 comprises an input 712 for receiving a signal indicative of enrollment data 714. The training unit 718 further comprises an output connected to the coupling link 716 for communicating with the verification unit 700. In a specific form of implementation, the training unit 718 is implemented substantially as the apparatus 606 for generating a pair of data elements described in connection with FIG. 6 of the drawings. The input 602 for receiving enrollment data 600 and the output 618 of the apparatus 606 correspond respectively to the input 712 for receiving enrollment data 714 and the coupling link 716 of the training unit 718. In this specific form of implementation, the training unit comprises a computer readable medium 850 corresponding to the computer readable medium 616. The computer readable medium 850 comprises a set of records, each record being associated to a respective speaker. Each record comprises a speaker independent template and an extended speaker specific pattern.

The verification unit 700 comprises a first input 708 for receiving a verification attempt 706 and a second input operatively connected to the coupling link 716 for communicating with the training unit 718. In an alternative embodiment, input 712 and input 708 correspond to the same physical input, i.e., the enrollment data 714 and the verification attempt 706 are received at the same input. The verification unit 700 is operative to process a verification attempt 706 on a basis of a speaker independent template and an extended speaker specific pattern associated to a claimed speaker to generate a data element indicative of whether the speaker verification attempt is successful or unsuccessful.

Advantageously, by making use of an extended speaker specific pattern, an improvement in the speaker verification process can be obtained. The verification scores obtained by using the extended speaker specific pattern allow a more precise representation of the acoustic properties of the claimed speaker and of the recognition attempt. Consequently the use of the extended speaker specific pattern improves the performance of speaker verification units.

Figure 8:
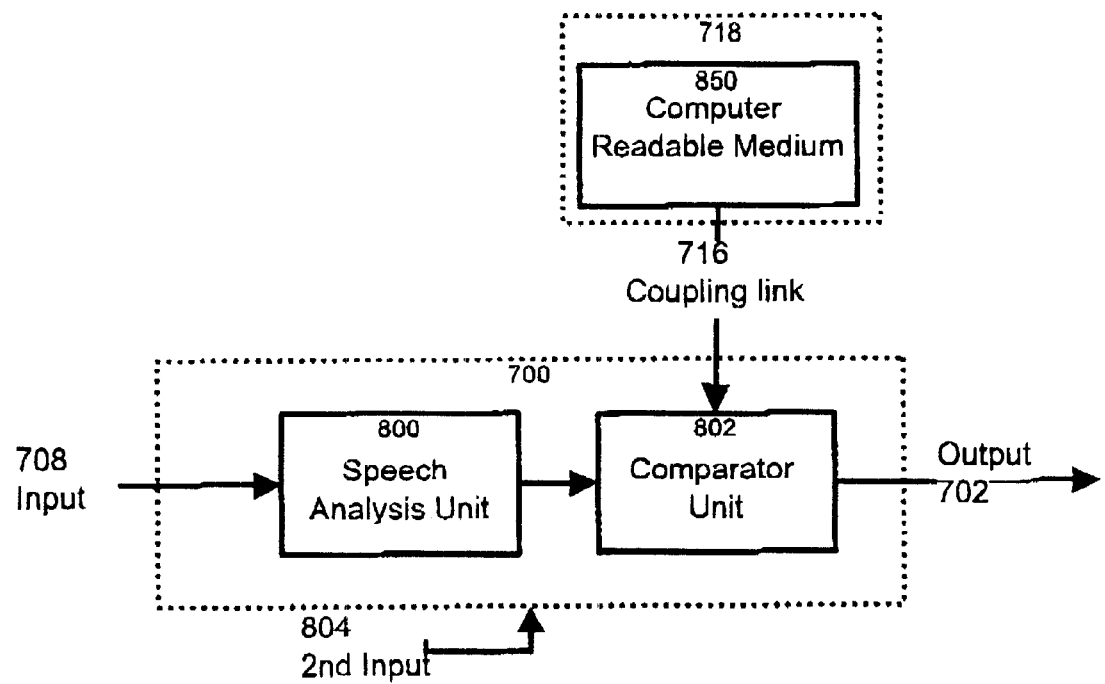
FIG. 8 shows a detailed block diagram of the verification unit of the system depicted in FIG. 7 in accordance with an embodiment of the invention.

An embodiment of the verification unit 700 suitable for use in the specific form of implementation of the training unit 718 is shown in FIG. 8 of the drawings. The verification unit 700 is indicative of an apparatus for performing speaker verification comprising a first input 708 for receiving a verification attempt for verification against a claimed speaker. The verification unit 700 further comprises coupling link 716 for receiving a speaker independent template and an extended speaker specific pattern associated with the claimed speaker. The verification unit 700 further comprises a processing unit coupled to the first input 708 and the coupling link 716 operative to process the verification attempt on a basis of the speaker independent template and the extended speaker specific pattern. The processing unit generates a data element indicative of whether the speaker verification attempt is successful or unsuccessful. The verification unit 700 further comprises an output 702 for releasing the data element indicative of whether the speaker verification attempt is successful or unsuccessful.

In a specific example of implementation, the processing unit of the verification unit 700 comprises a speech analysis unit 800 and a comparator unit 802. The speech analysis unit 800 is coupled to the input 708 and is operative to receive an electronic signal to extract the acoustic parameters associated with the verification attempt 706. In a specific example of implementation, the speech analysis unit 800 is implemented in a manner substantively similar to that described in connection with the speech analysis unit 608 in FIG. 6 of the drawings. In an alternative embodiment, the speech analysis unit 800 and speech analysis unit 608 are implemented as a same physical unit. In other words, the training unit 718 and the verification unit 700 make use of a same speech analysis unit. Advantageously, sharing the speech analysis unit between the training unit 718 and the verification unit 700 allows a reduction in the number of components in the speaker verification system. Optionally, the verification unit further comprises a second input 804 for receiving an identifier data element associated to a claimed speaker. The second input 804 can be in the form of a computer keypad, a telephone keypad, a magnetic swipe card, or any other suitable input device. In an alternative embodiment, the second input 604 of the training unit corresponds to the second input 804 whereby a single input is required for receiving the identifier data element for the training unit of the verification unit.

The comparator unit 802 comprises an input for receiving acoustic parameters associated with the verification attempt 706 and a record associated to a claimed speaker. The record is extracted from a computer readable medium 850, on a basis of an identifier associated with the claimed speaker.

In a first form of implementation, the speaker verification process makes use of an extended speaker specific pattern. The speaker verification as performed by comparator unit 802 is done using logarithmic likelihoods in the following manner:

$$\log L(O) = \log p(O|\lambda SD')$$

where $L(O)$ is the likelihood of a verification attempt 706 for an observation O, $p(O|\lambda SD')$ is the probability that an observation O corresponds to the parameters given by $\lambda SD'$ indicative of the extended speaker specific speech pattern.

In a second form of implementation, the speaker verification process makes use of a normalizing technique on the basis of an extended speaker specific pattern and a normalizing template. In broad terms, normalizing techniques involve computing a likelihood score indicative of a probability that the verification attempt was generated by the claimed speaker and normalizing the likelihood score by a second score, herein referred to as the normalizing score. For additional information on the background, cohort and world normalizing methods, the reader is invited to refer to Gu et al. (1998) "An Implementation and Evaluation of an On-line speaker Verification System for Field Trials" *Proc. ICASSP*'98, pp. 125–128 and to Rosenberg et al. (1996) "Speaker Background Models for Connected Digit Password Speaker Verification" *Proc. ICASSP* '96, pp. 81–84. the contents of these documents are hereby incorporated by reference. In this specific example of implementation, the normalizing template is indication of the speaker independent template. The person skilled in the art will readily observe than templates other that the speaker independent template may be used here without detracting from the spirit of the invention. In this second form of implementation, the speaker verification as performed by comparator unit 802 is done using logarithmic likelihoods in the following manner:

$$\log L(O) = \log p(O|\lambda SD') - \log p(O|\lambda Snorm)$$

where $L(O)$ is the likelihood of a verification attempt 706 for an observation O, $p(O|\lambda SD')$ is the probability that an observation O corresponds to the parameters given by $\lambda SD'$ indicative of the extended speaker specific speech pattern and $p(O|\lambda Snorm)$ is the probability that observation O corresponds to the parameters given by $\lambda Snorm$ indicative of the normalizing template.

The resulting logarithmic likelihood $\{\log L(O)\}$ is then compared against a threshold value to generate a data element indicative of whether the verification attempt is successful or unsuccessful. In a specific example, if the logarithmic likelihood $\{\log L(O)\}$ is above or equal to the threshold, a data element indicative of a successful verification attempt is generated and, if the logarithmic likelihood $\{\log L(O)\}$ is below the threshold, a data element indicative of an unsuccessful verification attempt is generated. In a specific example, the threshold is determined on a basis of experimentation. The comparator unit 802 then releases the data element in the form of an access grant, in the form of a yes/no type answer or in any other suitable format.

Figure 9:
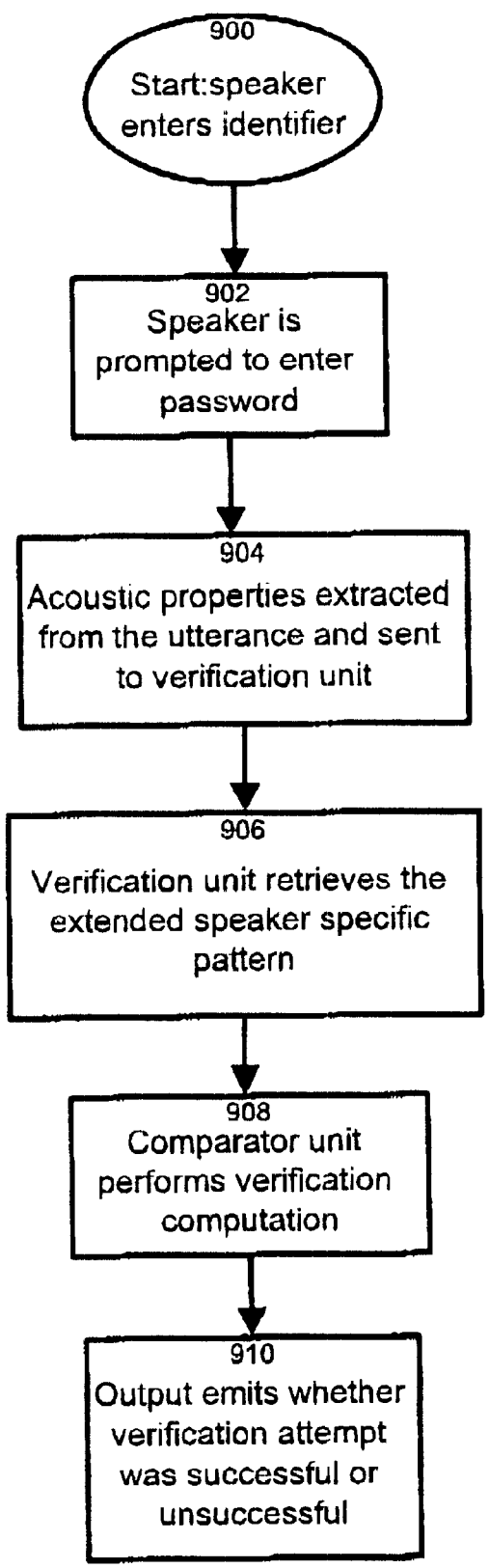
FIG. 9 shows a detailed flow chart of a speaker verification method in accordance with an embodiment of the invention.

In a typical interaction, as shown in FIG. 9 of the drawings, a speaker provides 900 the speaker verification apparatus with an identifier data element associated to a claimed speaker. The speaker then enters 902 via a microphone or telephone set an utterance indicative of a verification attempt. The acoustic properties of the utterance are then extracted 904 by the speech analysis unit and forwarded to the comparator unit. The speaker verification unit then makes use of the identifier data element received at step 900 to retrieve 906 from a computer readable medium the record associated to the claimed speaker. The verification is then performed 908 in the comparator unit 802 using the method previously described. The speaker verification system then emits 910 a data element indicative of whether the verification attempt was successful or unsuccessful.

In a specific context of implementation, the speaker verification system such as described above is a component of a security system.

Figure 11:
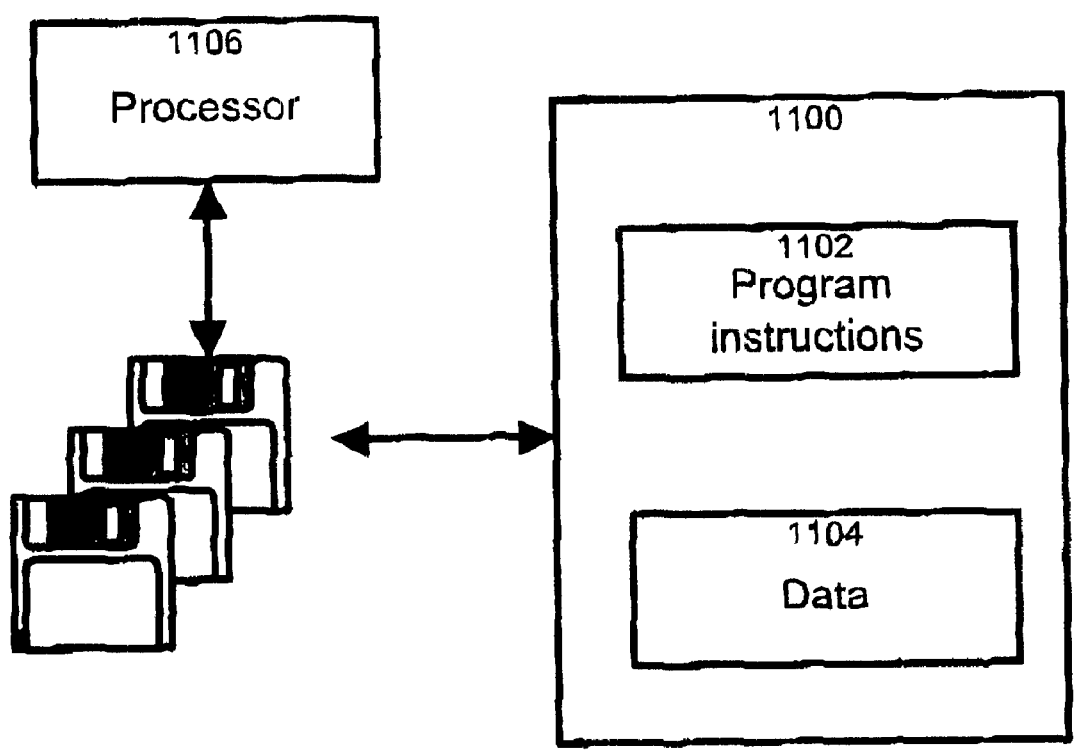
FIG. 11 shows an apparatus for implementing the methods shown in FIGS. 9 and 10 in accordance with an embodiment of the invention.

The above-described methods and apparatus for use in speaker verification can also be implemented on any suitable computing platform as shown in FIG. 11. Such a computing platform typically includes a processor 1106 and a memory or computer readable medium 1100 connected to the processor 1106 by a data communication bus. The memory stores the data 1104 and the instructions of the program element 1102 implementing the functional blocks depicted in the drawings and described in the specification. In a first specific example, the program element 1102 implements the apparatus 100 for creating a set of expanded speech models. In a second specific example, the program element 1102 is operative for generating a pair of data elements as described in connection with the apparatus in FIG. 6 and the method in FIG. 10 of the drawings. Continuing the second specific example, the reference speaker independent model set is stored in the data portion 1104 of the memory 1100. The program element 1102 operates on the data 1104 in accordance with the algorithms described above to generate a pair of data elements suitable for use in a speaker verification system using the techniques described in this specification.

Although the present invention has been described in considerable detail with reference to certain preferred embodiments thereof, variations and refinements are possible without departing from the spirit of the invention. Therefore, the scope of the invention should be limited only by the appended claims and their equivalents.

What is claimed is:

1. An apparatus for creating a set of expanded speech models comprising:
   an input for receiving a signal representative of enrollment data;
   a processing unit coupled to said input, said processing unit being operative for:
   a) processing said enrollment data to generate a set of simple speech models trained on a basis of said enrollment data, each simple speech model in said set of simple speech models comprising a plurality of states linked by transitions;
   b) generating on a basis of the set of simple speech models a set of expanded speech models, each expanded speech model in said set of expanded speech models comprising a plurality of groups of states, the groups of states being linked to one another by a plurality of inter=group transitions, states in a given group of states originating from a state in a given simple speech model of said set of simple speech models;
   c) processing the set of expanded speech models on the basis of the enrollment data to condition at least one of the plurality inter-group transitions on the basis of the enrollment data;
      an output for releasing a signal conveying the set of expanded speech models in a format suitable for use by a speech processing device.

2. An apparatus as defined in claim 1, wherein states in a given group of states are linked to one another by a plurality of intra-group transitions.

3. An apparatus an defined in claim 2, wherein said processing unit is further operative for processing the set of expanded speech models on the basis of the enrollment data to condition at least one of the plurality of intra-group transitions on the basis of the enrollment data.

4. An apparatus as defined in claim 1, wherein said at least one of the plurality of inter-group transitions forms a first sub-set of said plurality of inter-group transitions, said processing unit being operative to condition a second sub-set of inter-group trransitions on the basis of said first sub-set of inter-group transitions, said second sub-set of inter-group transitions comprising inter-group transitions selected from said plurality of inter-group transitions, said second sub-set of inter-group transitions excluding inter-group transitions from said first sub-set of inter-group transitions.

5. An apparatus as defined in claim 1, wherein the speech processing device is a speaker verification device.

6. A speaker verification system comprising the apparatus defined in claim 1.

7. An apparatus for generating a pair of data elements, namely a first element representative of a speaker independent template and a second element representative of an extended speaker specific speech pattern, the pair of data elements being suitable for use in a speaker verification system said apparatus comprising:
   a) an input for receiving an audio signal derived from a spoken utterance forming enrollment data associated with a given speaker;
   b) a processing unit coupled to said input, said processing unit being operative for:
      processing the audio signal to derive a speaker independent template;
      processing the audio signal on a basis of a reference speaker independent model set for generating a speaker specific speech pattern, the speaker specific speech pattern including a set of simple speech models trained on a basis of said audio signal, each simple speech model in said set of simple speech models comprising a plurality of states linked by transitions;
      processing the speaker specific speech pattern to derive an extended speaker specific speech pattern, said extended speaker specific speech pattern comprising a set of expanded speech models, each expanded speech model in said set of expanded speech models comprising a plurality of groups of states, the groups of states being linked to one another by a plurality of inter-group transitions, states in a given group of states originating from a state in a given simple speech model of said set of simple speech models;
   c) an output for releasing a signal conveying the pair of data elements in a format suitable for use by a speaker verification system.

8. An apparatus as defined in claim 7, wherein said processing unit is further operative for processing the extended speaker specific speech pattern on the basis of the audio signal to condition at least one of the plurality of inter-group transitions.

9. An apparatus as defined in claim 8, wherein states in a given group of states are linked to one another by a plurality of intra-group transitions.

10. An apparatus as defined in claim 9, wherein said processing unit is further operative for processing the extended speaker specific speech pattern on the basis of the audio signal to condition at least one of the plurality of intra-group transitions.

11. An apparatus as defined in claim 10, further comprising a computer readable medium coupled to said output for storing the pair of data elements.

12. An apparatus as defined in claim 11, wherein said input is a first input, said apparatus comprises a second input for receiving a signal conveying a speaker identification data element, said processing unit being operative to store the speaker identification data element on said computer readable medium and establish a link between the speaker identification data element stored on said computer readable medium and the pair of data elements.

13. An apparatus as defined in claim 7, wherein said processing unit comprises:
   a) a speaker specific speech pattern generator unit operative for processing the input signal on a basis of the reference speaker independent model set to generate said speaker specific speech pattern;
   b) an extended speaker specific pattern generator coupled to said speaker specific speech pattern generator unit and to said input, said extended speaker specific pattern generator being operative to process the speaker specific speech pattern and the audio signal to derive the extended speaker specific pattern.

14. An apparatus as defined in claim 13, wherein the speaker specific speech pattern generator unit uses a maximum a posterior adaptation method to derive the speaker specific pattern.

15. A speaker verification system comprising the apparatus of claim 7.

16. A method for generating a pair of data elements, namely a first element representative of a speaker independent template and a second element representative of an extended speaker specific pattern, the pair of data elements being suitable for use in a speaker verification system, said method comprising:
   a) receiving an audio signal derived from a spoken utterance forming enrollment data associated with a given speaker;
   b) processing the audio signal on a basis of a reference speaker independent model set to derive a speaker independent template;
   c) processing the audio signal on a basis of a reference speaker independent model set to generate a speaker specific speech pattern, the speaker specific speech pattern including a set of simple speech models trained on a basis of said audio signal, each simple speech model in said set of simple speech models comprising a plurality of states linked by transitions;
   d) processing the speaker specific speech pattern to derive an extended speaker specific pattern, said extended speaker specific speech pattern comprising a set of expanded speech models, each expanded speech model in said set of expanded speech models comprising a plurality of groups of states, the groups of states being linked to one another by a plurality of inter-group transitions, states in a given group of states originating from a state in a given simple speech model of said set of simple speech models;
   e) releasing as output a signal conveying the pair of data elements in a format suitable for use by a speaker verification system.

17. A method as defined in claim 16, further comprising processing the extended speaker specific speech pattern on the basis of the audio signal to condition at least one of the plurality of inter-group transitions.

18. A method as defined in claim 17, wherein states in a given group of states are linked to one another by intra-group transitions.

19. A method as defined in claim 18, wherein further comprising processing the extended speaker specific speech pattern on the basis of the audio signal to condition at least one of the plurality of intra-group transitions.

20. A method as defined in claim 19, further comprising generating the speaker specific speech pattern using a maximum a posterior adaptation method on the basis of the speaker independent template.

21. A method as defined in claim 16, further comprising storing the pair of data elements on a computer readable medium.

22. A method as defined in claim 20, further comprising:
   receiving a signal conveying a speaker identification data element;
   storing the speaker identification data element on the computer readable medium;
   establishing a link between the speaker identification data element stored on the computer readable medium and the pair of data elements.

23. A computer readable medium containing a verification database comprising a plurality of pairs of data elements generated by the method defined claim 16.

24. A computer readable medium comprising a program element suitable for execution by a computing apparatus for generating a pair of data elements, namely a first element representative of a speaker independent template and a second element representative of an extended speaker specific pattern, the pair of data elements being suitable for use in a speaker verification system, said computing apparatus comprising:
   a memory unit for storing an electronic representation of a reference speaker independent model set;
   a processor operatively connected to said memory unit, said program element when executing on said processor being operative for implementing:
      a) an input for receiving an audio signal derived from a spoken utterance forming enrollment data associated with a given speaker;
      b) a training unit coupled to said input, said training unit being operative for:
         processing the audio signal to derive a speaker independent template;
         processing the audio signal on a basis of the reference speaker independent model set for generating a speaker specific speech pattern, the speaker specify speech pattern including a set of simple speech models trained on a basis of said audio signal, each simple speech model in said set of simple speech models comprising a plurality of states linked by transitions;
         processing the speaker specific speech pattern to derive an extended speaker specific speech pattern, said extendee speaker specific speech pattern comprising a set of expanded speech models, each expanded speech model in said set of expanded speech models comprising a plurality of groups of states, the groups of states being linked to one another by a plurality of inter-group transitions, states in a given group of states originating from a state in a given simple speech model said set of simple speech models;
      c) an output for releasing a signal conveying the pair of data elements in a format suitable for use by a speaker verification system.

25. A computer readable medium as defined in claim 24, wherein said training unit is further operative for processing the extended speaker specific speech pattern on the basis of the audio signal to condition at least one of the plurality inter-group transitions.

26. A computer readable medium as defined in claim 25, wherein states in a given group of states are linked to one another by a plurality of intra-group transitions.

27. A computer readable medium as defined in claim 26, wherein said training unit is further operative for processing the extended speaker specific speech pattern on the basis of the audio signal to condition at least one of the plurality of intra-group transitions.

28. A computer readable medium as defined in claim 24, further comprising a data storage unit operatively coupled to the output for storing the pair of data elements.

29. A computer readable medium as defined in claim 24, wherein the program element is further operative for implementing a maximum a posterior adaptation method to derive the speakers specific pattern.

30. An apparatus for creating a set of expanded speech models comprising:
   means for receiving a signal representative of enrollment data;
   means for processing said enrollment data to generate a set of simple speech models trained on a basis of said enrollment data, each simple speech model in said set of simple speech models comprising a plurality of states linked by transitions;

means for generating on a basis of the set of simple speech models a set of expanded speech models, each expanded speech model in said set of expanded speech models comprising a plurality of groups of states, the groups of states being linked to one another by a plurality of inter-group transitions, states in a given group of states originating from a state in a given simple speech model of said set of simple speech models;

means for processing the set of expanded speech models on the basis of the enrollment data to condition at least one of the plurality inter-group transitions on the basis of the enrollment data;

means for releasing as output a signal conveying the set of expanded speech models in a format suitable for use by a speech processing device.

31. A method for creating a set of speech models comprising:

receiving a signal representative of enrollment data;

processing said enrollment data to generate a set of simple speech models trained on a basis of said enrollment data, each simple speech model in said set of simple speech models comprising a plurality of states linked by transitions;

generating on a basis of the set of simple speech models a set of expanded speech models, each expanded speech model in said set of expanded speech models comprising a plurality of groups of states, the groups of states being linked to one another by a plurality on inter-group transitions, states in a given group of states originating from a state in a given speech model of said set of simple speech models;

processing the set of expanded speech models on the basis of the enrollment data to condition at least one of the plurality inter-group transitions on the basis of the enrollment data;

releasing as output a signal conveying the set of expanded speech models in a format suitable for use by a speech processing device.

* * * * *

UNITED STATES PATENT AND TRADEMARK OFFICE
CERTIFICATE OF CORRECTION

PATENT NO.   : 6,499,012 B1
DATED        : December 24, 2002
INVENTOR(S)  : Stephen Douglas Peters et al.

It is certified that error appears in the above-identified patent and that said Letters Patent is hereby corrected as shown below:

Column 18,
Line 30, change "extendee" to -- extended --
Line 53, change "one" to -- some --
Line 60, change "posterior" to -- posteriori --
Line 61, change "speakers" to -- speaker --

Signed and Sealed this

Thirteenth Day of May, 2003

JAMES E. ROGAN
*Director of the United States Patent and Trademark Office*